United States Patent
Slavin et al.

(10) Patent No.: US 10,013,039 B2
(45) Date of Patent: Jul. 3, 2018

(54) SYSTEM AND METHOD OF MANAGING POWER AT A UNIVERSAL BUS (USB) PORT OF A BLUETOOTH-ENABLED MOBILE DEVICE

(71) Applicant: MOTOROLA SOLUTIONS, INC, Schaumburg, IL (US)

(72) Inventors: Stanislav Slavin, St-Petersburg (RU); Ekaterina Ivanova, St-Petersburg (RU); Alexander A. Zotov, St. Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 137 days.

(21) Appl. No.: 15/027,266

(22) PCT Filed: Nov. 15, 2013

(86) PCT No.: PCT/RU2013/001023
§ 371 (c)(1),
(2) Date: Apr. 5, 2016

(87) PCT Pub. No.: WO2015/072877
PCT Pub. Date: May 21, 2015

(65) Prior Publication Data
US 2016/0246344 A1     Aug. 25, 2016

(51) Int. Cl.
*G06F 1/32*     (2006.01)
*G06F 9/44*     (2018.01)
(Continued)

(52) U.S. Cl.
CPC .............. *G06F 1/28* (2013.01); *G06F 1/3278* (2013.01); *G06F 1/3287* (2013.01);
(Continued)

(58) Field of Classification Search
CPC ........ G06F 1/28; G06F 1/3278; G06F 1/3287; G06F 9/4411; H04W 4/008; H04W 4/80; Y02B 60/126; Y02B 60/1282
See application file for complete search history.

(56) References Cited

U.S. PATENT DOCUMENTS

| | | |
|---|---|---|
| 6,779,185 B1 | 8/2004 | Roukbi et al. |
| 7,577,856 B2 | 8/2009 | Oshins et al. |

(Continued)

FOREIGN PATENT DOCUMENTS

| | | |
|---|---|---|
| EP | 1416358 A2 | 5/2004 |
| EP | 2215781 A1 | 8/2010 |

OTHER PUBLICATIONS

"Transport Bus Driver for Bluetooth Power Control Handling Guidelines", Feb. 28, 2012 (Feb. 28, 2012), XP055132566, Retrieved from the Internet:URL:http://download.microsoft.com/download %2F4%2FD%2FA% 2F4DA4242C-F5FA-4D24-962E-OFE 79F33A1F0%2Ftransport-bus-driver-for-bluet ooth-power-handling.docx [retrieved on Jul. 31, 2014], pp. 8-10, section "Wake from Sleep".

(Continued)

*Primary Examiner* — Fahmida Rahman

(57) ABSTRACT

A Bluetooth filter driver sends non-native, Bluetooth configuration data via a USB port to a Bluetooth controller by commanding a Bluetooth USB driver to change the state of the USB port to a power-up state in a Bluetooth-enabled, wireless mobile device.

10 Claims, 2 Drawing Sheets

(51) Int. Cl.
*G06F 1/28* (2006.01)
*G06F 9/4401* (2018.01)
*H04W 4/80* (2018.01)

(52) U.S. Cl.
CPC ............ *G06F 9/4411* (2013.01); *H04W 4/80* (2018.02); *Y02D 10/157* (2018.01); *Y02D 10/171* (2018.01)

(56) References Cited

U.S. PATENT DOCUMENTS

| | | | | |
|---|---|---|---|---|
| 8,798,541 | B1* | 8/2014 | Scott | G06F 9/45545 455/41.2 |
| 9,329,887 | B2* | 5/2016 | Brandstatter | G06F 9/45558 |
| 2005/0010828 | A1* | 1/2005 | Oh | G06F 1/3215 713/300 |
| 2006/0161415 | A1 | 7/2006 | Takahashi et al. | |
| 2010/0049881 | A1 | 2/2010 | Manor et al. | |
| 2010/0162022 | A1 | 6/2010 | Kim et al. | |
| 2012/0084592 | A1 | 4/2012 | Lin et al. | |
| 2012/0124595 | A1 | 5/2012 | Hsu et al. | |

OTHER PUBLICATIONS

"Bluetooth specification version 4.0—HCI Functional Specification—USB Transport Layer", Jun. 30, 2010 (Jun. 30, 2010), XP055132541, Retrieved from the Internet: URL:https://www.bluetooth.org/docman/handl ers/downloaddoc.ashx?doc id=229737 [retrieved on Jul. 31, 2014], p. 108.

Mark Russinovich et al: "Windows Internals, Part 2, 6th edition, Chapter 8, I/0 Systems' In: 11Windows Internals, Part 2, 6th edition, Chapter 8, I/0 Systems", Jan. 1, 2012 (Jan. 1, 2012), XP055132547, ISBN: 978-0-73-566587-3 , p. 6, p. 101, pp. 105-106.

The International Search Report and the Written Opinion, PCT/RU2013,001023, filed: Nov. 15, 2013, dated Jun. 26, 2014, all pages.

Microsoft Corporation: "Increasing System Power Efficiency through Driver Support for Runtime Idle Detection", Apr. 23, 2008, pp. 1-23.

* cited by examiner

SYSTEM AND METHOD OF MANAGING POWER AT A UNIVERSAL BUS (USB) PORT OF A BLUETOOTH-ENABLED MOBILE DEVICE

FIELD OF THE DISCLOSURE

The present disclosure relates generally to a system for, and a method of, managing power at a universal serial bus (USB) port of a mobile device having a Bluetooth controller, and, more particularly, to a Bluetooth filter driver for sending non-native, Bluetooth configuration data via the USB port to the Bluetooth controller by operatively commanding a Bluetooth USB driver to change a state of the USB port to a power-up state.

BACKGROUND

Bluetooth is a known wireless technology standard for exchanging data over relatively short distances using radio waves in the ISM band from 2400-2480 MHz between wireless mobile devices, such as telephones, tablets, personal digital assistants, media players, headsets, laptops, printers, modems, watches, pairs of glasses, and like mobile devices. Such a Bluetooth-enabled device has a host central processing unit (CPU) in which an operating system, e.g., Windows (trademark), is implemented. The operating system is typically embedded with a software-implemented, Bluetooth stack that supports various native Bluetooth profiles, e.g., PAN, SPP, DUN, HID, HCRP, etc., or native Bluetooth versions, e.g., Version 1.0 or Version 2.0. These Bluetooth profiles include settings to parameterize and control the behavior that Bluetooth-enabled devices use to communicate with one another. These Bluetooth versions include specifications regarding data rate and maximum data throughput. Each such Bluetooth-enabled device also has a hardware-implemented Bluetooth controller, typically provided on an integrated circuit chip that is separate from the host CPU. A Wi-Fi controller is sometimes provided on the same chip as the Bluetooth controller. The Bluetooth controller is connected to an antenna to transmit or receive the radio waves.

It is often desired to change the native Bluetooth profile by adding new features to an existing Bluetooth profile, or by substituting a new Bluetooth profile, or by changing the Bluetooth version to, for example, Version 3.0 (high-speed) or Version 4.0 (low-energy). For this purpose, a vendor-supplied, software-implemented, Bluetooth filter driver is often used to send such non-native, Bluetooth configuration data to the Bluetooth controller.

However, this data must pass through a universal serial bus (USB) port, which is the most common interface between the Bluetooth controller and the Bluetooth stack. USB provides high transmission speeds, as well as advanced power saving and management capabilities. A USB hub supplies data and power to downstream USB ports. Often, the USB hub, together with a host USB driver and a USB controller, manage the power of any device connected to its USB ports. Power can be turned on (a power-up state), or turned off (a power-down state), at any individual USB port, or group of USB ports. If no activity is detected at a USB port, e.g., no data has passed through the USB port over a certain time period, e.g., 2-10 seconds, then power to the inactive USB port can be selectively suspended in the power-down state to conserve power usage.

A problem with the existing Bluetooth architecture is that the USB port may be in the power-down state when the filter driver needs to send data to the Bluetooth controller. If the USB port is in the power-down state, then the data will fail to reach the Bluetooth controller. The filter driver is configured as a non-power policy owner and is, therefore, inoperative for directly changing the state of the USB port. The filter driver can track the state of the USB port, but cannot modify it. There are no current standards or methods for a filter driver to become a power policy owner, and thereby modify the state of the USB port.

The art has proposed the use of upper level, additional hardware components, as well as additional software abstraction layers, to execute vendor-specific commands that bypass the filter driver to modify the state of the USB port. Yet, these commands are specific and customized to each Bluetooth controller, and are not universal across different Bluetooth controllers made by different manufacturers.

Accordingly, there is a need to avoid the need for, and the expense of, additional hardware components and software layers, and to employ the filter driver itself in changing the state of the USB port despite the fact that the filter driver is not configured as a power policy owner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
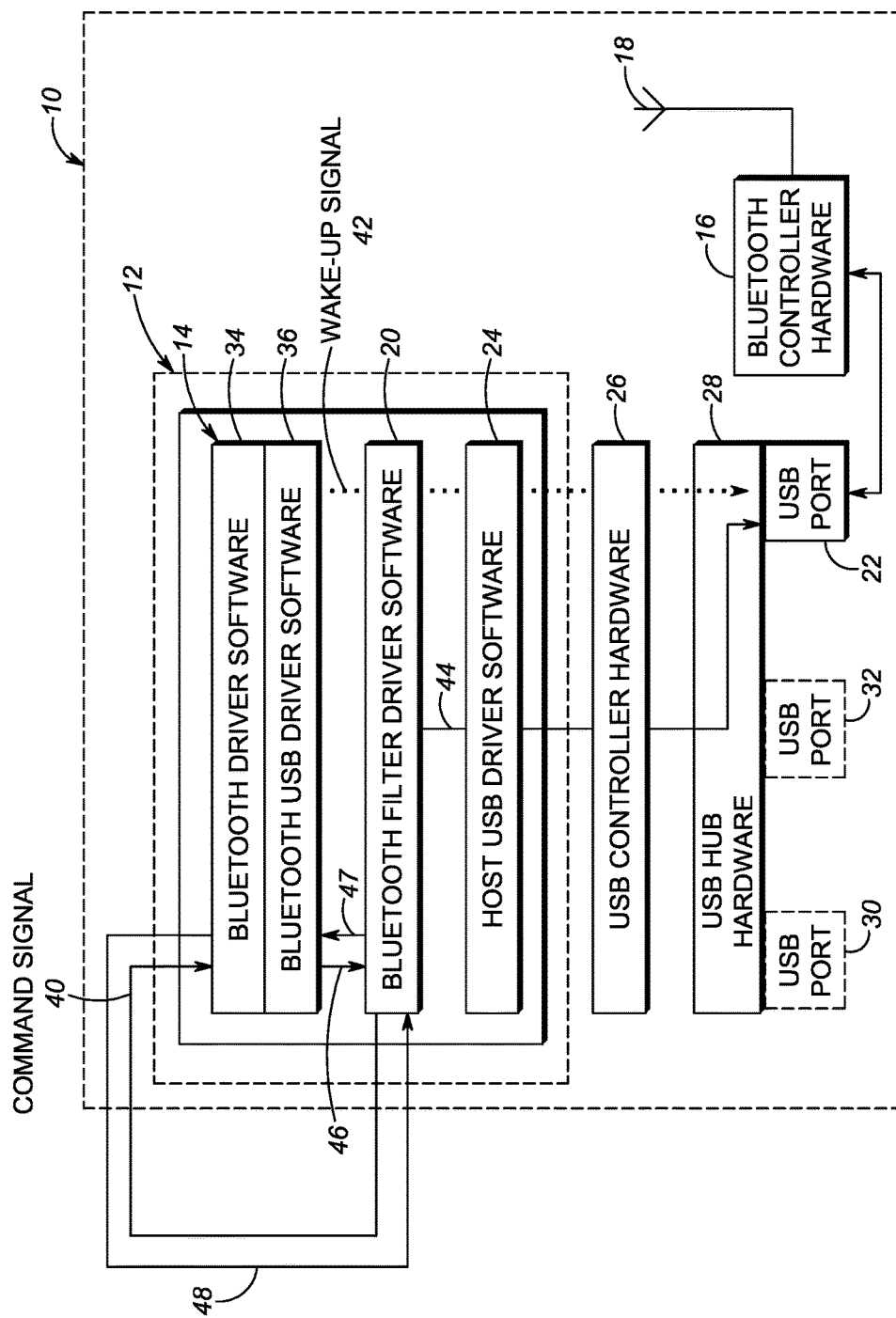
FIG. 1 is a block diagram of a system for managing power at a USB port of a mobile device in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a system for managing power at a universal serial bus (USB) port of a wireless mobile device having a Bluetooth controller. The Bluetooth-enabled wireless mobile device may be a telephone, a tablet, a personal digital assistant, a media player, a headset, a laptop, a printer, a modem, a watch, a pair of glasses, or a like mobile device. The USB port is preferably part of a hub that includes one or more additional USB ports.

The system includes a Bluetooth USB driver configured as a power policy owner, and operative for changing a state of the USB port from a power-down state to a power-up state; and a Bluetooth filter driver configured as a non-power policy owner and being inoperative for directly changing the state of the USB port. The Bluetooth filter driver is operatively connected to the Bluetooth controller via the USB port. The Bluetooth filter driver is operative for sending non-native Bluetooth configuration data via the USB port to the Bluetooth controller by operatively commanding the Bluetooth USB driver to change the state of the USB port to the power-up state. Thus, the filter driver itself is responsible for changing the state of the USB port despite the fact that the filter driver is not configured as a power policy owner. Advantageously, the Bluetooth controller is configured with a native operating protocol and/or a native Bluetooth version, and the Bluetooth filter driver is operative for modifying the native operating protocol and/or the native version by sending the configuration data to the Bluetooth controller.

In a preferred embodiment, the Bluetooth USB driver is part of a Bluetooth stack that includes an upper level Bluetooth driver, and the Bluetooth filter driver is operative for commanding the Bluetooth USB driver via a command signal sent to the Bluetooth stack. The Bluetooth USB driver is operative for detecting the state of the USB port, for determining, upon receipt of the command signal by the Bluetooth stack, whether the detected state of the USB port needs to be changed, and for issuing a wake-up signal to the USB port when the detected state is the power-down state. Advantageously, the command signal is a general universal command recognizable by another Bluetooth stack and another Bluetooth controller of another mobile device. The Bluetooth USB driver is operative for determining a transaction time needed to send the data to the Bluetooth controller, and for determining an inactivity time remaining before the USB port is changed to the power-down state, and for issuing the wake-up signal to the USB port when the transaction time is greater than the inactivity time.

A method of managing power at a universal serial bus (USB) port of a wireless mobile device having a Bluetooth controller, in accordance with another aspect of this disclosure, is performed by configuring a Bluetooth USB driver as a power policy owner for changing a state of the USB port from a power-down state to a power-up state, by connecting a Bluetooth filter driver to the Bluetooth controller via the USB port, by configuring the Bluetooth filter driver as a non-power policy owner that is inoperative for directly changing the state of the USB port, and by sending non-native Bluetooth configuration data from the filter driver via the USB port to the Bluetooth controller by configuring the filter driver to command the Bluetooth USB driver to change the state of the USB port to the power-up state.

Turning now to FIG. 1 of the drawings, reference numeral 10 generally identifies a Bluetooth-enabled, wireless mobile device, such as a telephone, a tablet, a personal digital assistant, a media player, a headset, a laptop, a printer, a modem, a watch, a pair of glasses, or a like mobile device. The device 10 has a host central processing unit (CPU) 12 in which an operating system, e.g., Windows (trademark), is implemented. As described above, the operating system is typically embedded with a software-implemented, Bluetooth stack 14 that supports various native Bluetooth profiles, or native Bluetooth versions. These Bluetooth profiles include settings to parameterize and control the behavior that Bluetooth-enabled devices 10 use to communicate with one another. These Bluetooth versions include specifications regarding data rate and maximum data throughput. Each such Bluetooth-enabled device 10 also has a hardware-implemented, Bluetooth controller 16, typically provided on an integrated circuit chip that is separate from the host CPU 12. A Wi-Fi controller is sometimes provided on the same chip as the Bluetooth controller 16. The Bluetooth controller 16 is connected to an antenna 18 to transmit or receive the radio waves.

As also described above, it is often desired to change the native Bluetooth profile by adding new features to an existing Bluetooth profile, or by substituting a new Bluetooth profile, or by changing the Bluetooth version to a newer version. For this purpose, a vendor-supplied, software-implemented, Bluetooth filter driver 20 is used to send such non-native, Bluetooth configuration data to the Bluetooth controller 16.

However, this data must pass through a universal serial bus (USB) port, e.g., representative USB port 22, which is the most common interface between the Bluetooth controller 16 and the Bluetooth stack 14. USB provides high transmission speeds, as well as advanced power saving and management capabilities, by operation of a software-implemented, USB driver 24, a hardware-implemented, USB controller 26, and a USB hub 28, all of which supply data to, and manage power at, one or more downstream USB ports 22, 30, 32. Power can be turned on (a power-up state), or turned off (a power-down state), at any individual USB port 22, or group of the USB ports 22, 30, 32. If no activity is detected at a USB port, e.g., no data has passed through the representative USB port 22 over a certain time period, e.g., 2-10 seconds, then power to the inactive USB port 22 can be selectively suspended in the power-down state.

The aforementioned Bluetooth stack 14 includes a software-implemented, Bluetooth driver 34, and a software-implemented, Bluetooth USB driver 34. The Bluetooth USB driver 34 is configured as a power policy owner, and is therefore capable of changing a state of the USB port from a power-down state to a power-up state, as described below. All the drivers 34, 36, 20, 24 are preferably installed on the host CPU 12.

As further explained above, a problem with the existing Bluetooth architecture is that the USB port 22 may be in the power-down state when the filter driver 20 needs to send data to the Bluetooth controller 16. If the USB port 22 is in the power-down state, then the data will fail to reach the Bluetooth controller 16. The filter driver 20 is configured as a non-power policy owner and is, therefore, inoperative for directly changing the state of the USB port 22. The filter driver 20 can track the state of the USB port 22, but cannot modify it. There are no current standards or methods for a filter driver 20 to become a power policy owner, and thereby modify the state of the USB port 22.

In accordance with this disclosure, the Bluetooth filter driver 20 operatively commands the Bluetooth USB driver 36 to change the state of the USB port 22 to the power-up state. More particularly, the Bluetooth filter driver 20 sends a command signal 40 to the Bluetooth driver 34 of the Bluetooth stack 14 and, in turn, to the USB driver 36. The command signal 40 is a general universal command recognizable by another Bluetooth stack 14 and another Bluetooth controller 16 of another mobile device 10. Thus, this disclosure has applicability to a range of mobile devices and is independent of specific hardware.

The Bluetooth USB driver 36 is operative for detecting the state of the USB port 22, for determining, upon receipt of the command signal 40 by the Bluetooth stack 14, whether the detected state of the USB port 22 needs to be changed, and for issuing a wake-up signal 42 to the USB port 22 when the detected state is the power-down state. The Bluetooth USB driver 36 is operative for determining a transaction time, e.g., 1 second, needed to send the data to the Bluetooth controller 16, and for determining an inactivity time remaining before the USB port 22 is changed to the power-down state, and for issuing the wake-up signal 42 to the USB port 22 when the transaction time is greater than the inactivity time.

The filter driver 20 and the USB driver 36 can now signal each other along lines 46, 47 that the data is ready to be sent, and the Bluetooth stack 14 can acknowledge receipt along the line 48 to the filter driver 20. Now that the USB port 22 is in the power-up state, the filter driver 20 can successfully send the configuration data along line 44 to the Bluetooth controller 16 via the powered-up USB port 22.

Figure 2:
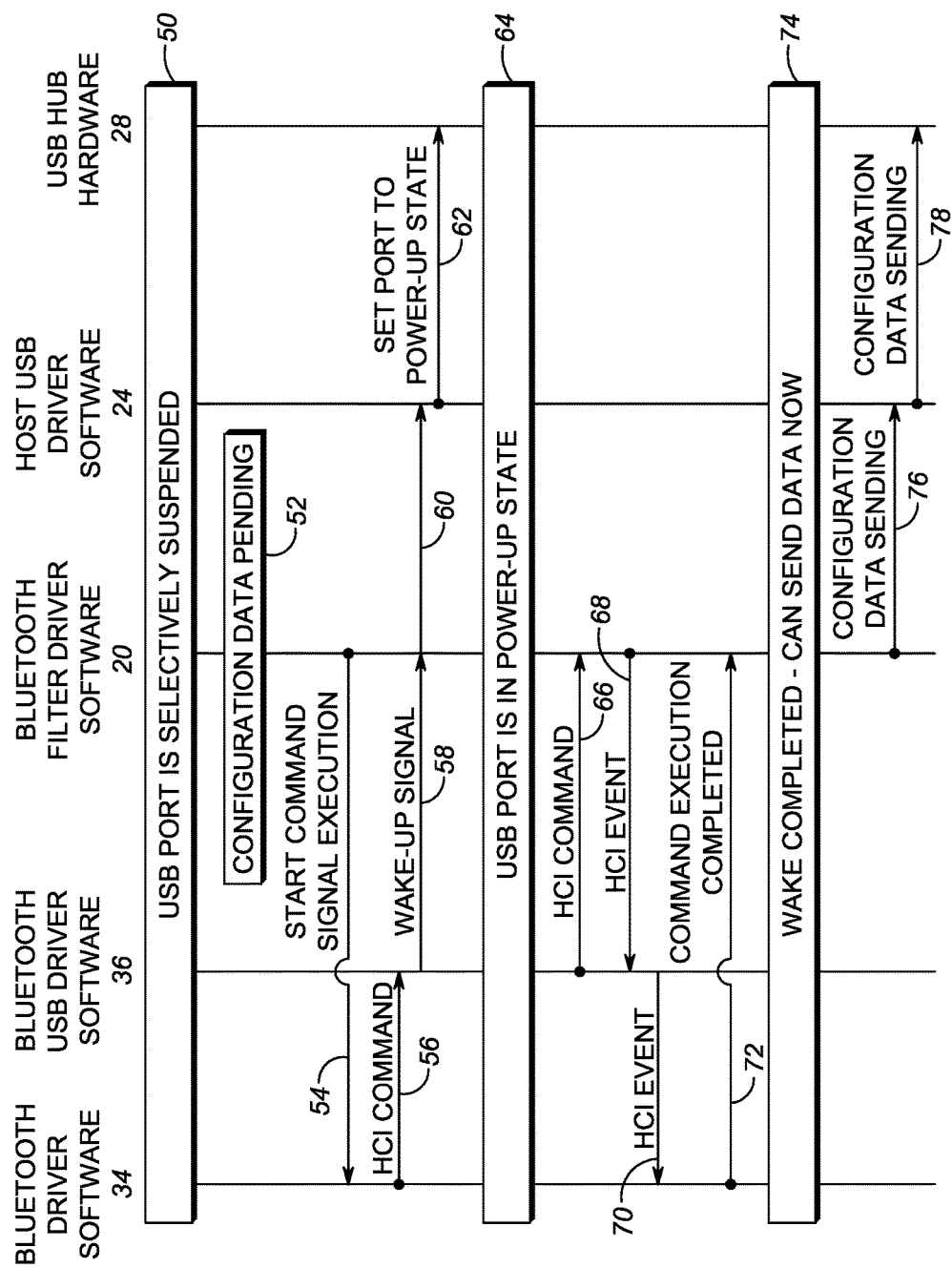
FIG. 2 is a sequence chart of a method of managing power in the system of FIG. 1 in accordance with the present disclosure.

FIG. 2 is a sequence chart that depicts the Bluetooth driver 34, the Bluetooth USB driver 36, the Bluetooth filter driver 20, the host USB driver 24, and the USB hub 28 arranged across a top row, and their various actions are set forth in sequence as one moves down the chart away from the top row. To begin, it is assumed that the USB port 22 is selectively suspended, i.e., in the power-down state, in block 50, and that the filter driver 20 has configuration data ready to be sent to the Bluetooth controller 16 in block 52. Next, the filter driver 20 sends the command signal 40 to the Bluetooth driver 34 on line 54 and, in response, the Bluetooth driver 34 sends a host controller interface (HCI) command on line 56 to the Bluetooth USB driver 36. In response, the Bluetooth USB driver 36 sends the wake-up signal 42 sequentially to the filter driver 20 on line 58, the USB driver 24 on line 60, and the USB hub 28 on line 62. The USB port 22 is now set to the power-up state in block 64.

The Bluetooth USB driver 36 now sends an HCI command to the filter driver 20 on line 66, and the filter driver 20 sends an HCI event response to the USB driver 36 on line 68 and, in turn, to the Bluetooth driver 34 on line 70. The Bluetooth driver 34 responds to the filter driver 20 on line 72 that the command signal 40 has completed its execution. Now that the wakeup of the USB port 22 has been completed in block 74, the filter driver 20 sends its configuration data to the USB driver 24 on line 76, and to the USB hub 28 on line 78 for eventual delivery to the Bluetooth controller 16 via the USB port 22. Thus, despite the fact that the filter driver 20 is not configured as a power policy owner, it can still get the USB port changed to the power-up state by commanding the USB driver 36 to take over this function.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A wireless mobile device for managing power at a universal serial bus, USB, port of the wireless mobile device having a Bluetooth controller hardware, comprising:
 a Bluetooth USB driver configured as a power policy owner, and operative for changing a power state of the USB port from a power-down state to a power-up state;
 a Bluetooth filter driver, communicatively coupled between the Bluetooth USB driver and a host USB driver that is itself coupled to a USB controller hardware, configured as a non-power policy owner and being inoperative for directly changing the power state of the USB port, and operatively connected to the Bluetooth controller hardware via the host USB driver, USB controller hardware, and USB port, the Bluetooth filter driver being operative for tracking a power state of the USB port and, when the USB port is in a power-down state and the Bluetooth filter driver has pending non-native Bluetooth configuration data to send via the USB port to the Bluetooth controller hardware, operatively commanding the Bluetooth USB driver to change the power state of the USB port to the power-up state and subsequently forwarding a wake-up signal received from the Bluetooth USB driver to the host USB driver; and
 wherein the Bluetooth controller hardware is configured with a native operating protocol and a native Bluetooth version, and wherein the Bluetooth filter driver is operative for modifying at least one of the native operating protocol and the native version by sending the non-native Bluetooth configuration data to the Bluetooth controller hardware.

2. The wireless mobile device of claim 1, wherein the USB port is part of a hub that includes an additional USB port, and the USB controller hardware controls the additional USB port.

3. A method of managing power at a universal serial bus, USB, port of a wireless mobile device where the USB port is communicatively coupled to a Bluetooth controller hardware, comprising:
 configuring a Bluetooth USB driver as a power policy owner for changing a power state of the USB port from a power-down state to a power-up state;
 connecting a Bluetooth filter driver to the Bluetooth controller hardware via a host USB driver, USB controller hardware, and the USB port;
 configuring the Bluetooth filter driver as a non-power policy owner that is inoperative for directly changing the power state of the USB port;
 tracking a power state of the USB port and, when the USB port is in a power-down state and the Bluetooth filter driver has non-native Bluetooth configuration data to send via the USB port to the Bluetooth controller hardware by commanding the Bluetooth USB driver to change the power state of the USB port to the power-up state and subsequently forwarding a wake-up signal received from the Bluetooth USB driver to the host USB driver;
 configuring the Bluetooth USB driver as part of a Bluetooth stack that includes an upper level Bluetooth driver, and commanding the Bluetooth USB driver via a command signal sent from the filter driver to the Bluetooth stack; and
 configuring the command signal as a command recognizable by another Bluetooth stack and another Bluetooth controller hardware of another mobile device.

4. A wireless mobile device for managing power at a universal serial bus, USB, port of the wireless mobile device having a Bluetooth controller hardware, comprising:
 a Bluetooth USB driver configured as a power policy owner, and operative for changing a power state of the USB port from a power-down state to a power-up state;
 a Bluetooth filter driver, communicatively coupled between the Bluetooth USB driver and a host USB driver that is itself coupled to a USB controller hardware, configured as a non-power policy owner and being inoperative for directly changing the power state of the USB port, and operatively connected to the Bluetooth controller hardware via the host USB driver, USB controller hardware, and USB port, the Bluetooth filter driver being operative for tracking a power state of the USB port and, when the USB port is in a power-down state and the Bluetooth filter driver has pending non-native Bluetooth configuration data to send via the USB port to the Bluetooth controller hardware, operatively commanding the Bluetooth USB driver to change the power state of the USB port to the power-up state and subsequently forwarding a wake-up signal received from the Bluetooth USB driver to the host USB driver;
 wherein the Bluetooth USB driver is part of a Bluetooth stack that includes an upper level Bluetooth driver, and wherein the Bluetooth filter driver is operative for commanding the Bluetooth USB driver via a command signal sent to the Bluetooth stack; and
 wherein the Bluetooth USB driver is operative for detecting the power state of the USB port, for determining, upon receipt of the command signal by the Bluetooth stack, whether the detected power state of the USB port needs to be changed, and for issuing the wake-up signal to the USB port when the detected power state is the power-down state.

5. A wireless mobile device for managing power at a universal serial bus, USB, port of the wireless mobile device having a Bluetooth controller hardware, comprising:
 a Bluetooth USB driver configured as a power policy owner, and operative for changing a power state of the USB port from a power-down state to a power-up state;
 a Bluetooth filter driver, communicatively coupled between the Bluetooth USB driver and a host USB driver that is itself coupled to a USB controller hardware, configured as a non-power policy owner and being inoperative for directly changing the power state of the USB port, and operatively connected to the Bluetooth controller hardware via the host USB driver, USB controller hardware, and USB port, the Bluetooth filter driver being operative for tracking a power state of the USB port and, when the USB port is in a power-down state and the Bluetooth filter driver has pending non-native Bluetooth configuration data to send via the USB port to the Bluetooth controller hardware, operatively commanding the Bluetooth USB driver to change the power state of the USB port to the power-up state and subsequently forwarding a wake-up signal received from the Bluetooth USB driver to the host USB driver;

wherein the Bluetooth USB driver is part of a Bluetooth stack that includes an upper level Bluetooth driver, and wherein the Bluetooth filter driver is operative for commanding the Bluetooth USB driver via a command signal sent to the Bluetooth stack; and wherein the command signal is a command recognizable by another Bluetooth stack and another Bluetooth controller hardware of another mobile device.

6. A wireless mobile device for managing power at a universal serial bus, USB, port of the wireless mobile device having a Bluetooth controller hardware, comprising:

a Bluetooth USB driver configured as a power policy owner, and operative for changing a power state of the USB port from a power-down state to a power-up state;

a Bluetooth filter driver, communicatively coupled between the Bluetooth USB driver and a host USB driver that is itself coupled to a USB controller hardware, configured as a non-power policy owner and being inoperative for directly changing the power state of the USB port, and operatively connected to the Bluetooth controller hardware via the host USB driver, USB controller hardware, and USB port, the Bluetooth filter driver being operative for tracking a power state of the USB port and, when the USB port is in a power-down state and the Bluetooth filter driver has pending non-native Bluetooth configuration data to send via the USB port to the Bluetooth controller hardware, operatively commanding the Bluetooth USB driver to change the power state of the USB port to the power-up state and subsequently forwarding a wake-up signal received from the Bluetooth USB driver to the host USB driver;

wherein the Bluetooth USB driver is part of a Bluetooth stack that includes an upper level Bluetooth driver, and wherein the Bluetooth filter driver is operative for commanding the Bluetooth USB driver via a command signal sent to the Bluetooth stack; and wherein the Bluetooth USB driver is operative for determining a transaction time needed to send the non-native Bluetooth configuration data to the Bluetooth controller hardware, and for determining an inactivity time remaining before the USB port is changed to the power-down state, and for issuing the wake-up signal to the USB port when the transaction time is greater than the inactivity time.

7. A method of managing power at a universal serial bus, USB, port of a wireless mobile device where the USB port is communicatively coupled to a Bluetooth controller hardware, comprising:

configuring a Bluetooth USB driver as a power policy owner for changing a power state of the USB port from a power-down state to a power-up state;

connecting a Bluetooth filter driver to the Bluetooth controller hardware via a host USB driver, USB controller hardware, and the USB port;

configuring the Bluetooth filter driver as a non-power policy owner that is inoperative for directly changing the power state of the USB port; and tracking a power state of the USB port and, when the USB port is in a power-down state and the Bluetooth filter driver has non-native Bluetooth configuration data to send via the USB port to the Bluetooth controller hardware by commanding the Bluetooth USB driver to change the power state of the USB port to the power-up state and subsequently forwarding a wake-up signal received from the Bluetooth USB driver to the host USB driver; and configuring the Bluetooth controller hardware with a native operating protocol and a native Bluetooth version, and modifying at least one of the native operating protocol and the native version by sending the non-native Bluetooth configuration data from the filter driver to the Bluetooth controller hardware.

8. The method of claim 7, further comprising configuring the USB port as part of a hub that includes an additional USB port, and controlling the additional USB port with the USB controller hardware.

9. A method of managing power at a universal serial bus, USB, port of a wireless mobile device where the USB port is communicatively coupled to a Bluetooth controller hardware, comprising:

configuring a Bluetooth USB driver as a power policy owner for changing a power state of the USB port from a power-down state to a power-up state;

connecting a Bluetooth filter driver to the Bluetooth controller hardware via a host USB driver, USB controller hardware, and the USB port;

configuring the Bluetooth filter driver as a non-power policy owner that is inoperative for directly changing the power state of the USB port;

tracking a power state of the USB port and, when the USB port is in a power-down state and the Bluetooth filter driver has non-native Bluetooth configuration data to send via the USB port to the Bluetooth controller hardware by commanding the Bluetooth USB driver to change the power state of the USB port to the power-up state and subsequently forwarding a wake-up signal received from the Bluetooth USB driver to the host USB driver;

configuring the Bluetooth USB driver as part of a Bluetooth stack that includes an upper level Bluetooth driver, and commanding the Bluetooth USB driver via a command signal sent from the filter driver to the Bluetooth stack; and configuring the Bluetooth USB driver to detect the power state of the USB port, to determine, upon receipt of the command signal by the Bluetooth stack, whether the detected power state of the USB port needs to be changed, and to issue the wake-up signal to the USB port when the detected power state is the power-down state.

10. The method of claim 9, further comprising determining a transaction time needed to send the non-native Bluetooth configuration data to the Bluetooth controller hardware, determining an inactivity time remaining before the USB port is changed to the power-down state, and issuing the wake-up signal from the Bluetooth USB driver to the USB port when the transaction time is greater than the inactivity time.

* * * * *